(12) United States Patent  (10) Patent No.: US 6,332,700 B1
Baines                     (45) Date of Patent:    Dec. 25, 2001

(54) TIRE CHANGING LIGHT

(75) Inventor: Albert L. Baines, Jonesboro, GA (US)

(73) Assignee: Albert L Baines ( * ) Notice: Subject to any disclaimer, the term of this patent is extended or adjusted under 35 U.S.C. 154(b) by 0 days.

(21) Appl. No.: 09/666,071

(22) Filed: Sep. 19, 2000

Related U.S. Application Data

(60) Provisional application No. 60/158,989, filed on Oct. 12, 1999.

(51) Int. Cl.$^7$ ....................................................... B60Q 1/00
(52) U.S. Cl. .................. 362/486; 362/399; 362/506; 362/500; 362/362; 362/387; 362/375
(58) Field of Search .................................. 362/399, 486, 362/506, 500, 362, 387, 375

(56) References Cited

U.S. PATENT DOCUMENTS

| | | | |
|---|---|---|---|
| 2,671,848 | * 3/1954 | Swayne | 362/387 |
| 2,802,932 | * 8/1957 | Lambert | 362/387 |
| 4,369,487 | * 1/1983 | Carlow | 362/387 |
| 4,458,304 | * 7/1984 | Imsdahl | 362/387 |
| 4,789,348 | * 12/1988 | Hampton | 439/142 |
| 4,894,755 | * 1/1990 | Chandler | 362/387 |
| 5,133,144 | * 7/1992 | Formica | 43/17 |
| 5,521,806 | * 5/1996 | Hutzel et al. | 362/387 |
| 5,558,426 | * 9/1996 | Cabanatan et al. | 362/387 |

* cited by examiner

*Primary Examiner*—Sandra O'Shea
*Assistant Examiner*—Guiyoung Lee

(57) ABSTRACT

A lighting assembly is detachably mounted in an opening in the wheel well panel of an vehicle. The lighting assembly has a base member with flexible sidewalls and end walls. The base member defines an opening near the first end wall forming a finger pull. A lamp holder is mounted on the base member near the second end wall. A clear lens covers a lamp in the lamp. An extensible power cable is attached to the lamp holder. The lighting assembly detaches from the wheel well to illuminate the wheel when changing a tire.

4 Claims, 2 Drawing Sheets

TIRE CHANGING LIGHT

CROSS-REFERENCE TO PROVISIONAL PATENT APPLICATION

This application of the inventor is based on his Provisional Patent Application No. 60/158,989, filed Oct. 12, 1999, entitled Safety Tire Changing Light.

FIELD OF THE INVENTION

The present invention relates generally to a lighting assembly for illuminating the wheel well area of a vehicle when changing a tire.

BACKGROUND OF THE INVENTION

While driving a vehicle, the tires are prone to damage from nails and other objects on the roadway. A flat tire must be replaced with a properly inflated tire before travel can resume regardless of the time of day. During daylight hours, changing a tire on the shoulder of a roadway is merely inconvenient, but during nighttime hours it is treacherous for at least two reasons. The first reason is that at night it is difficult to see clearly enough to ensure that the tire is replaced properly, and it usually takes longer to replace the tire than during daylight. The second reason is that it is more difficult for other drivers to see at night and thereby avoid a collision with a vehicle or person close to the roadway. Accordingly, it will be appreciated that it would be highly desirable to have a light for a driver to use to illuminate the wheel area when changing a tire at night.

There are flashlights with support stands, lanterns, plug-in lights with support stands, and other lighting devices that can be used to illuminate the wheel area of a vehicle when changing a tire a night. To be useful, a driver must have the device in the vehicle with the batteries charged. The devices are not standard, or even optional, equipment for the vehicle; so, a driver must acquire and install the device to have it ready for use in an emergency. It is therefore desirable to have a lighting device that is part of the vehicle and always ready for use.

SUMMARY OF THE INVENTION

The present invention is directed to overcoming one or more of the problems set forth above. Briefly summarized, according to one aspect of the present invention, a lighting assembly comprises a base member having first and second flexible sidewalls and first and second end walls with the base member defining an opening near the first end wall forming a finger pull. A lamp holder is mounted on the base member near the second end wall. A lens covering the lamp holder is removably attached to the base member. An extensible power cable is attached to the lamp holder.

The lighting assembly is detachable from the wheel well of an vehicle to illuminate the wheel when changing a tire. The power cord extends allowing the lamp holder to be positioned to cast light on the tire to be changed. The power cord retracts for storage.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

Figure 1:
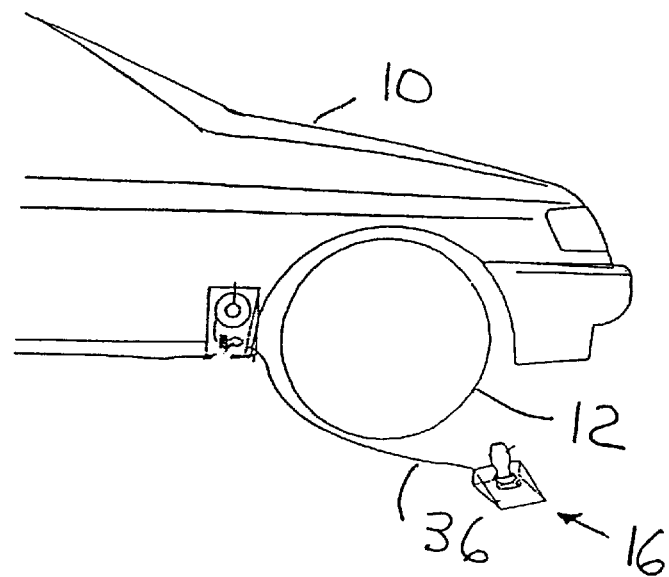
FIG. 1 is a diagrammatic side view of a preferred embodiment of a tire changing light extended for use when changing a tire of an vehicle according to the present invention.
Figure 2:
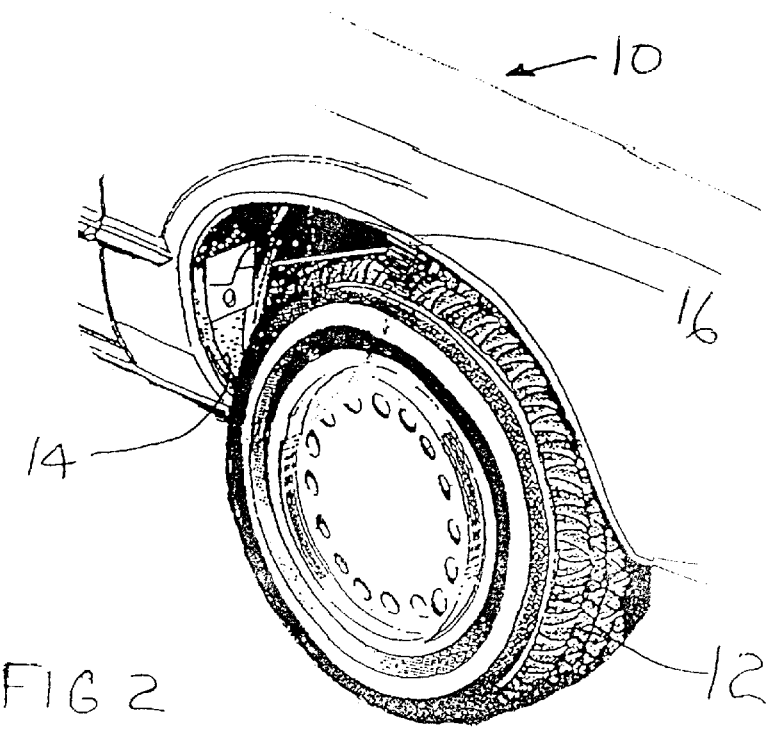
FIG. 2 illustrates the tire changing light retracted and stored in the wheel well of the vehicle.
Figure 3:
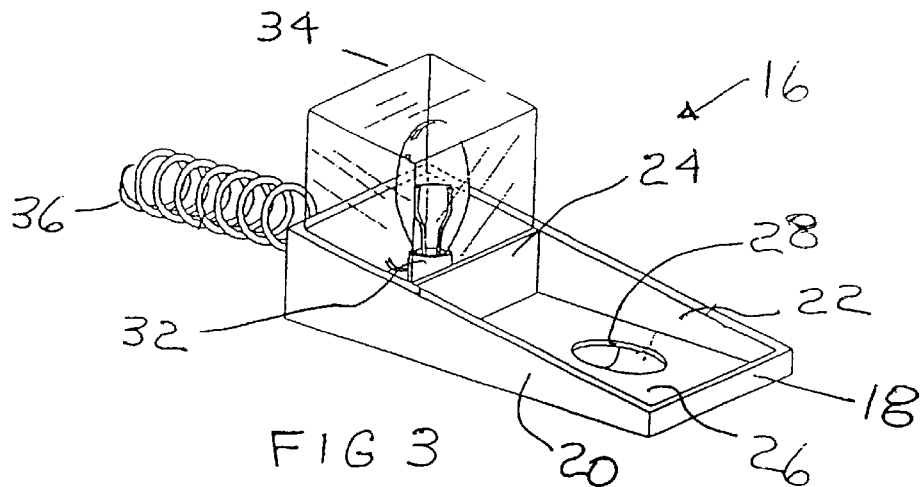
FIG. 3 is a somewhat enlarged perspective view of the tire changing light.
Figure 4:
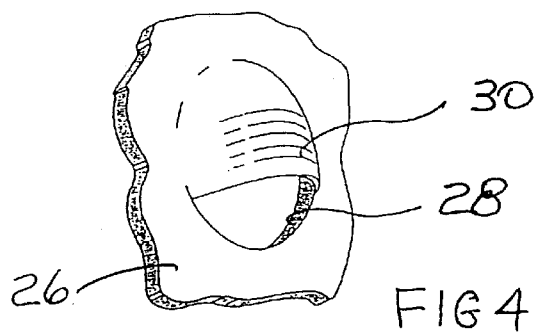
FIG. 4 illustrates a finger pull for inserting and removing the tire changing light.
Figure 5:
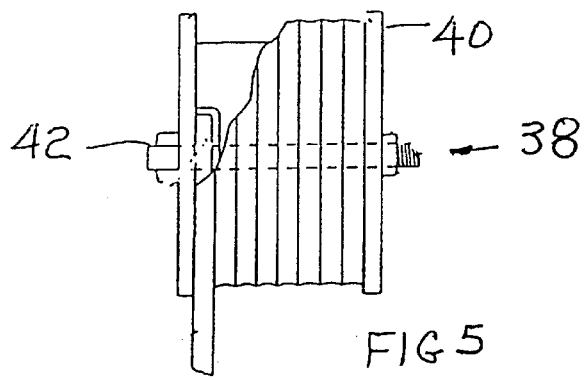
FIGS. 5 and 6 illustrate a power cable retractor mechanism for the tire changing light.
Figure 6:
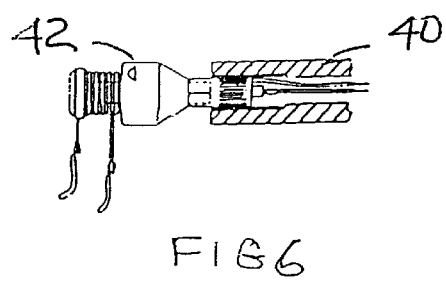

Referring to FIGS. 1–3, a vehicle, such as an automobile 10, has a wheel assembly fitted with a pneumatic tire 12. The tire is mounted in the wheel well area of the vehicle. While there are four wheel wells, only one is illustrated and described. It is to be understood that the invention is equally applicable to each wheel well and that the invention can be use with each individually or with all or with any combination of the wheel wells. A wheel well panel 14 separates the wheel well from the interior of the exterior panels of the vehicle. Wheel well panel 14 defines an opening that receives and holds a lighting assembly 16 which controllably illuminates the wheel well when mounted in the opening. When removed from the opening, the lighting assembly can be positioned to illuminate tire 12 while changing tire 12.

Lighting assembly 16 includes a base member 18 that has first and second sidewalls 20, 22 and a panel 24 extending between the first and second sidewalls 20, 22 dividing base member 18 into first and second compartments. The sidewalls 20, 22 are flexible to facilitate insertion and removal from the wheel well opening. Base member 18 has a bottom panel 24 having an opening 28 that is preferably partially covered by an arcuate member 30 forming a finger pull for inserting and removing the base member from the wheel well opening. Base member 18 may be constructed of metal but is preferably constructed of plastic, by injection molding or the like.

A lamp holder is mounted on bottom panel 24 base member 18 in the first compartment is covered by a removable lens 34. Lens 34 is preferably a clear piece of glass or plastic removably attached to the base member.

Referring to FIGS. 1–6, a power cable 36 is attached lamp holder 32 to deliver electrical energy to the lamp holder. Electrical energy flow can be controlled from the interior of the vehicle by control switches mounted on the dash. Such switches can energize one lamp at a time or any combination of lamps as desired. A portion of the cable 36 is preferably coiled to make the cable extensible so that the lighting assembly can be positioned at a distance from the tire that provides needed lighting without being in the way when changing the tire. Coiled the cable makes storing it easier because the cable tends to be self retracting.

To ensure that the power cable retracts completely and neatly, a retracting mechanism 38 can be used. The mechanism 38 has a spring loaded reel 40 mounted on the vehicle between the exterior panel of the vehicle and the wheel well panel. It may be mounted on either the exterior panel of the vehicle or the wheel well panel, or may be mounted on other members inside these panels. Such spring loaded reels are well known in the art pertaining to reels for power cords and cables. Reel 40 rotates on a bearing 42. Conductors for the power cord are fed through the bearing.

It can now be appreciated that a tire changing lighting assembly is detachably mounted in an opening in the wheel well panel of an vehicle. The lighting assembly has a base member with flexible sidewalls and end walls. The base member defines an opening near the first end wall forming a finger pull. A lamp holder is mounted on the base member near the second end wall. A clear lens covers a lamp in the lighting assembly. An extensible power cable is attached to the lamp holder. The lighting assembly detaches from the wheel well to illuminate the wheel when changing a tire. When stored in the wheel well the lens is inside the vehicle panels and is thereby protected from the environment.

As is evident from the foregoing description, certain aspects of the invention are not limited to the particular details of the examples illustrated. It is therefore contemplated that other modifications and applications will occur to those skilled the art. For example, a switch may be added to the base member so that the light can be switched on or off at the light rather than from a dash mounted switch. It is accordingly intended that the claims shall cover all such modifications and applications as do not depart from the true spirit and scope of the invention.

What is claimed is:

1. A lighting assembly for a wheel well of a vehicle, said wheel well defining an opening, said lighting assembly comprising:

a base member having first and second sidewalls and a panel extending between said first and second sidewalls dividing said base member into first and second compartments, said sidewalls being flexible to fit said base member into said opening of said wheel well, said base member defining an opening in said second compartment;

a curved member attached to said base member partially covering said opening in said second compartment of said base member forming a finger pull for removing said base member from said opening of said wheel well;

a lamp holder mounted on said base member in said first compartment;

a lens covering said lamp holder and being removably attached to said base member; and a power cable attached to said lamp holder to deliver electrical energy to said lamp holder, said power cable having a coiled portion so that said power cable is extensible.

2. A lighting assembly, as set forth in claim 1 including a spring loaded reel mounted on said vehicle, said power cable being wound on said reel, said power cable unwinding from said reel through said opening of said wheel well to extend to said lighting assembly.

3. A vehicle, comprising:

a wheel well housing a tire, said wheel well having a sidewall defining a sidewall opening;

a base member having first and second sidewalls and a panel extending between said first and second sidewalls dividing said base member into first and second compartments, said sidewalls flexing to fit said base meter into said sidewall opening;

a lamp holder mounted on said base member in said first compartment;

a lens covering said lamp holder and being removably attached to said base member;

a power cable attached to said lamp holder to deliver electrical energy to said lamp holder; and a spring loaded reel mounted on said vehicle, said power cable being wound on said reel, said power cable unwinding from said reel through said opening of said wheel well to extend to said base member and lamp holder, said power cable rewinding on said reel as said base member seats in said opening of said wheel well.

4. A vehicle, comprising:

a wheel well housing a tire, said wheel well having a sidewall defining a sidewall opening;

a base member having first and second sidewalls and a panel extending between said first and second sidewalls dividing said base member into first and second compartments, said base member defining an opening in said second compartment;

a curved member attached to said base member partially covering said opening in said second compartment of said base member forming a finger pull for removing said base member from said sidewall opening, said sidewalls flexing to fit said base member into said sidewall opening;

a lamp holder mounted on said base member in said first compartment;

a lens covering said lamp holder and being removably attached to said base member;

a power cable attached to said lamp holder to deliver electrical energy to said lamp holder; and a spring loaded reel mounted on said vehicle, said power cable being wound on said reel, said power cable unwinding from said reel through said sidewall opening to extend said base member toward said tire, said power cable rewinding on said reel as said base member seats in said sidewall opening.

* * * * *